(12) United States Patent
Carlson

(10) Patent No.: US 6,819,431 B2
(45) Date of Patent: Nov. 16, 2004

(54) POLYMER RETARDER

(75) Inventor: Andrew Eric Carlson, Higganum, CT (US)

(73) Assignee: Zygo Corporation, Middlefield, CT (US)

(*) Notice: Subject to any disclaimer, the term of this patent is extended or adjusted under 35 U.S.C. 154(b) by 0 days.

(21) Appl. No.: 10/180,779

(22) Filed: Jun. 25, 2002

(65) Prior Publication Data

US 2003/0011781 A1 Jan. 16, 2003

Related U.S. Application Data

(60) Provisional application No. 60/303,575, filed on Jul. 6, 2001.

(51) Int. Cl.$^7$ .................................................. G01B 9/02
(52) U.S. Cl. ........................................ 356/491; 356/492
(58) Field of Search ................................. 356/491, 492, 356/493, 494, 495, 498, 500

(56) References Cited

U.S. PATENT DOCUMENTS

| 4,795,246 A | 1/1989 | Lord .......................... 350/510 |
| 5,999,261 A | 12/1999 | Pressesky et al. .......... 356/351 |
| 6,163,379 A | 12/2000 | de Groot .................... 356/493 |

Primary Examiner—Samuel A. Turner
Assistant Examiner—Michael A. Lyons
(74) Attorney, Agent, or Firm—Fish & Richardson P.C.

(57) ABSTRACT

A retarder includes a birefringent film embedded in an adhesive between two plates. The adhesive is index matched to the birefringent film.

13 Claims, 5 Drawing Sheets

POLYMER RETARDER

RELATED APPLICATIONS

This application claims benefit to the priority date of U.S. Provisional Application 60/303,575 tiled on Jul. 6, 2001.

FIELD OF INVENTION

This invention relates to optical system components, and in particular, to retarders.

BACKGROUND

A typical retarder is a plate made of a material in which the speed of light depends on the polarization of that light. Such materials are known as "birefringent" materials. A birefringent material resolves an incident light wave into a slow wave, corresponding to one component of the incident light wave's polarization vector, and a fast wave, corresponding to another, orthogonal component of that wave's polarization vector. The slow wave travels at a slower velocity than, and is therefore retarded relative to, the fast wave. As a result, the wave that emerges from the birefringent material can have a polarization state that differs from that of the wave incident on the material.

The "retardance" of a retarder is a distance by which the slow wave is delayed relative to the fast wave. Commonly used retarders are those having retardances of $(n+\lambda/4)$ and $(n+\lambda/2)$, where "n" is an integer that describes the "order" of the retarder. For precision applications, in which stability with wavelength, temperature, and angle of incidence are critical, zeroth order retarders are desirable.

A commonly used birefringent material for making a retarder is quartz. However, the birefringence of quartz is such that only a very thin layer is required to achieve a zeroth order retarder. Such thin layers of quartz are notoriously fragile. In addition, quartz based retarders are expensive and difficult to manufacture in larger sizes.

Birefringent polymers overcome many of the disadvantages of quartz. However, such materials come as flexible films that must be mounted and glued between rigid plates. During the mounting process, the polymer films are prone to wrinkle. This wrinkling causes wavefront errors that are undesirable in high-precision applications.

SUMMARY

In one aspect, the invention features a retarder that includes a substrate and a cover plate separated from the substrate by a gap. The gap is occupied by an adhesive filler that has, embedded within it, a birefringent film. The birefringent film and the adhesive filler are index matched to each other, thereby reducing reflections at the interfaces between the film and the adhesive.

In another aspect, the invention features an interferometer having a polarizing beam splitter cube and a cover plate separated from a face of the cube by a gap. Embedded within an adhesive filler that occupies the gap is a birefringent film. The birefringent film and the adhesive filler are index matched to each other.

Another aspect of the invention features a retarder that includes a birefringent film embedded in an adhesive. The adhesive and the film are index matched each other.

Embodiments may include one or more of the following. An anti-reflective coating may be on a surface of at least one of the cover plate and the substrate. Such a coating may include thorium fluoride. At least one of the cover plate and the substrate may include fused silica. The birefringent film may include a polymer film.

The substrate and the cover plate can each have an inner surface facing the gap. These inner surfaces may be parallel to each other or oriented to direct a beam exiting the cover plate in a selected direction. Alternatively, the cover plate and the substrate may be disposed relative to each other to direct a beam exiting the cover plate in a selected direction.

Additional embodiments include those in which an optical device is in optical communication with a retarder or integrated with a retarder as set forth above. Examples of such optical devices include interferometers.

Embodiments of the invention may have one or more of the following advantages. The retarder provides low wavefront distortion, including both distortion introduced by optical elements and distortion introduced by beam shear. This results, in part, from the retarder's high thermal and mechanical stability, high tolerance retardation characteristics, and deterministic angular deviation of a beam exiting the retarder. A high stability plane mirror interferometer having an integral retarder according to the invention has fewer parts and fewer ghost reflections. This translates into a reduction in associated cyclic errors that can degrade performance.

These and other features and advantages of the invention will be apparent from the following detailed description and the accompanying drawings, in which:

DETAILED DESCRIPTION

Figure 1:
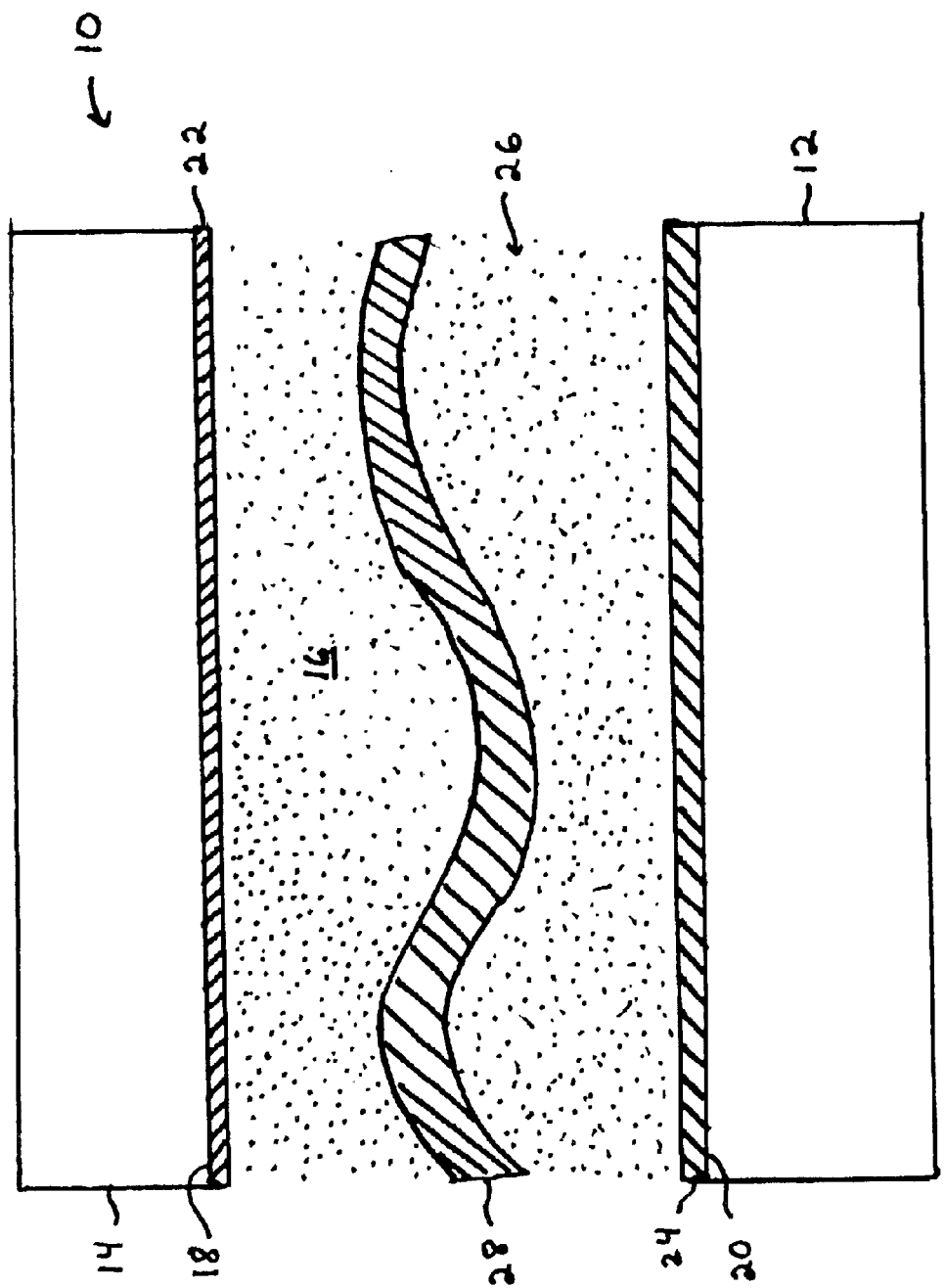
FIG. 1 is a cross-section of a portion of a retarder.

FIG. 1 shows, in cross section, a retarder 10 in which a substrate 12 and a cover plate 14, both of which are made of fused silica, are separated by a gap 16. The substrate 12 and cover plate 14 each have an inner surface 18, 20 with surface irregularities that extend, from peak to valley, no more than $\lambda/20$. Anti-reflective films 22, 24 coat the inner surfaces 18, 20 of the cover plate 14 and the substrate 12. These anti-reflective films 22, 24 are quarter wavelength thick thorium fluoride ($ThF_4$) films.

An adhesive filling 26 within the gap 16 suspends a birefringent polymer film 28 between the substrate 12 and the cover plate 14. The polymer film 28 is flexible and therefore prone to wrinkling. This wrinkling of the polymer film 28 causes irregular gaps to form between the polymer film 28 and the inner surfaces 18, 20 of the substrate 12 and cover plate 14. As a result of these irregular gaps, light crossing the gap 16 experiences wavefront distortion.

The adhesive 26 is selected to be index matched to the polymer 28. Since the adhesive 26 fills in the irregular gaps, this results in a uniformly thick transmission medium having essentially the same index of refraction everywhere in the gap 16.

The polymer 28, which is a birefringent material, is characterized by a dielectric tensor, whereas the adhesive 26, which is generally isotropic, is characterized by a scalar dielectric. Hence, it is not possible for an adhesive's index of refraction to exactly match that of the polymer 28. As used herein, index matching the polymer 28 and the adhesive 26 means selecting the adhesive 26 and the polymer 28 such that the adhesive's dielectric constant has a value that is close to the values of the scalar components of the polymer's dielectric tensor. In particular, the adhesive's dielectric constant is selected to be an average of the slow-wave and fast-wave dielectric constants of the polymer 28.

The retarder 10 finds use in a variety of optical systems. One system in which the retarder 10 plays an integral role is a high stability plane mirror interferometer 30 ("HSPMI") such as that shown in FIG. 2. The HSPMI 30 is a distance measuring interferometer in which a measurement beam and a reference beam are separated on the basis of their polarizations.

The illustrated interferometer 30 includes a polarizing beam-splitter cube 32 having an input face 34 for receiving an input beam, a measurement face 36 across from the input face 34, a reference face 38 opposite a reference mirror 40, and an output face 42 across from the reference face 38. The reference face 38 and the measurement face 36 meet at a common edge 44. A beam-splitting plane 46 bisects the cube 32 along a diagonal that includes this common edge 44.

A polarization-selective coating on the beam-splitting plane 46 transmits light of one polarization but reflects light of another, orthogonal polarization. In this way, the beam-splitting plane 46 divides a circularly polarized beam entering from the input face 34 into two linearly polarized beams having orthogonal polarizations. One of these beams, the measurement beam, proceeds through the beam-splitting plane 46 and out the measurement face 36 to a target 48. The other beam, which becomes the reference beam, is reflected to the reference face 38 and proceeds through that face and toward the reference mirror 40.

A reference quarter-wave retarder 50, of the type shown in FIG. 1, is mounted between the reference face 38 and the reference mirror 40. A measurement quarter-wave retarder 52 is mounted adjacent to the measurement face 36 such that, when a target 48 is positioned for illumination by the interferometer, the measurement retarder 52 lies between the measurement face 36 and the target 48.

When linearly polarized light having a first polarization vector passes through a quarter-wave retarder, it is transformed into circularly polarized light. If this circularly polarized light is reflected back into the quarter-wave retarder (so that it is now circularly polarized in the opposite direction), it is transformed back into linearly polarized light having a second polarization vector orthogonal to the first polarization vector.

An input beam entering the input face 34 of the cube 32 includes two components: a reference component and a measurement component. When first entering the cube 32, the reference component has a first linear polarization (the "S" polarization) and the measurement component has a second linear polarization (the "P" polarization) orthogonal to the S polarization. Throughout the following discussion, the beam-splitting plane 46 is assumed to reflect S-polarized light and to transmit P-polarized light.

Figure 3:
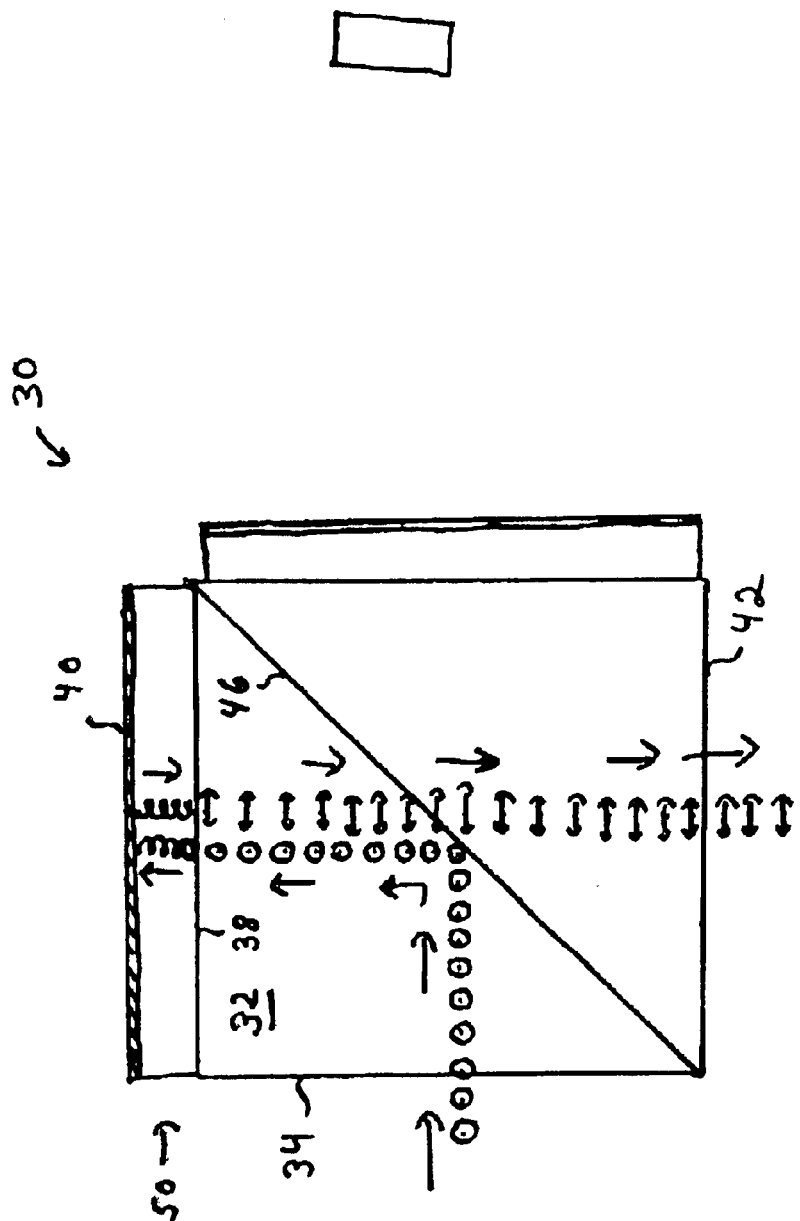
FIGS. 3–4 show the paths followed by a reference beam and a measurement beam in the interferometer of FIG. 2.

In FIG. 3, the reference component of the input beam enters the cube 32 through the input face 34 and reaches the beam-splitting plane 46. Since the reference component is S-polarized, the beam-splitting plane 46 reflects it toward the reference face 38. The reference component then passes through the reference retarder 50, from which it emerges circularly polarized. It then reflects off the reference mirror 40 and re-enters the reference retarder 50. Since, as a result of the reflection, the reference component is now circularly polarized in the opposite direction, it emerges from the reference retarder 50 P-polarized. Because it is now P-polarized, the reference component passes through the beam-splitting plane 46 and exits the cube 32 through the output face 42.

Figure 4:
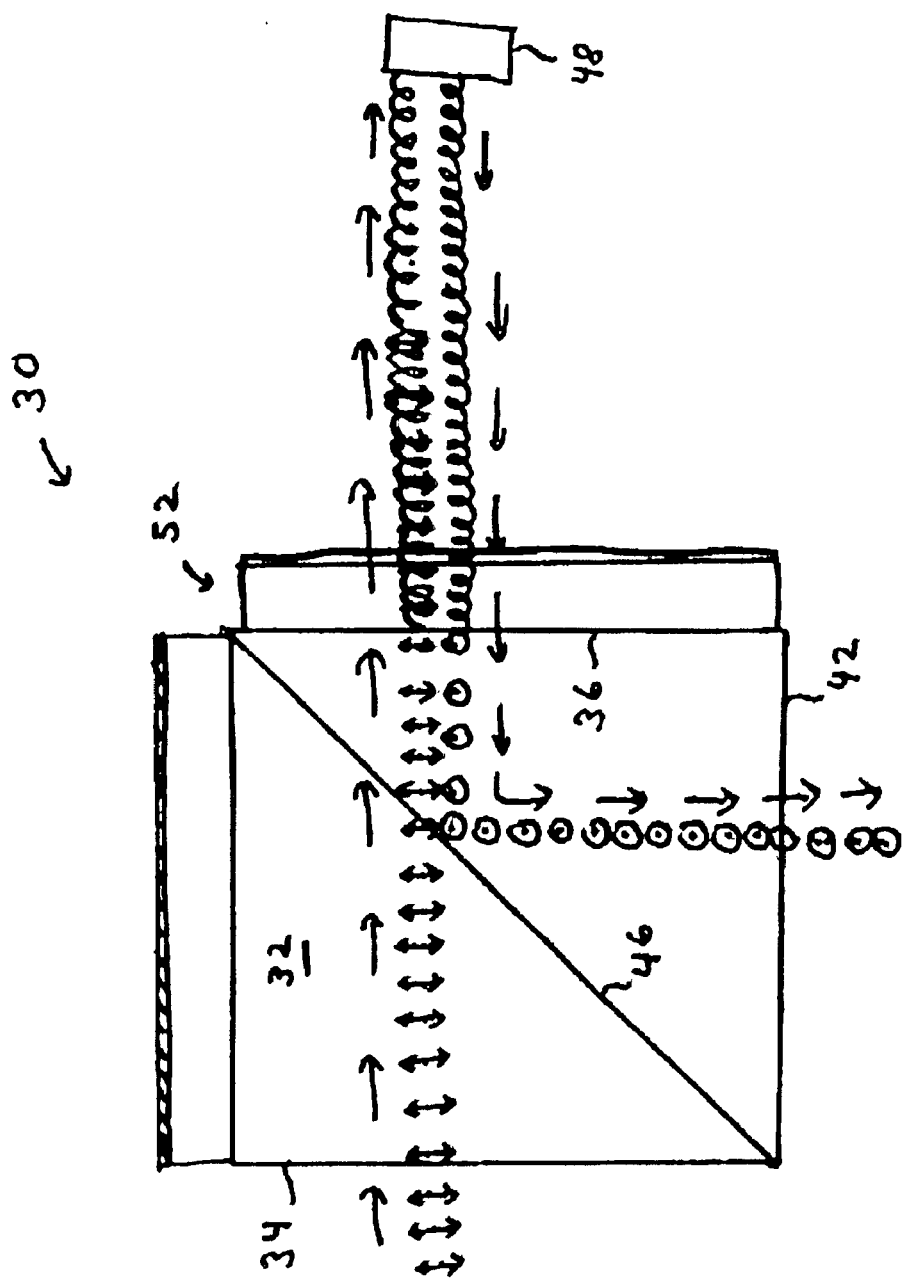

In FIG. 4, the measurement component of the input beam, like the reference component, enters the cube 32 through the input face 34 and reaches the beam-splitting plane 46. Unlike the reference component, the measurement component is P-polarized and therefore passes through the beam-splitting plane 46 unimpeded. The measurement component then exits the cube 32 through the measurement face 36 and enters the measurement retarder 52. It emerges from the measurement retarder 52 circularly polarized and proceeds toward the target 48.

After being reflected from the target 48, the measurement beam is still circularly polarized, but in the opposite direction. It then makes a second pass through the measurement retarder 52, from which it emerges S-polarized. As a result, when the measurement component reaches the beam-splitting plane 46 for the second time, it is reflected toward the output face 42, where it exits the cube 32.

By the time they reach the output face 42, both the reference component and the measurement component have traversed a path having an internal portion, in which they were both inside the cube 32, and an external portion, in which they were both outside the cube 32. The path lengths for the internal portions are the same for both the measurement component and the reference component. The path lengths for the external portion are, however, different. This difference in path length provides a basis for an interferometric measurement of the distance to the target 48.

Figure 2:
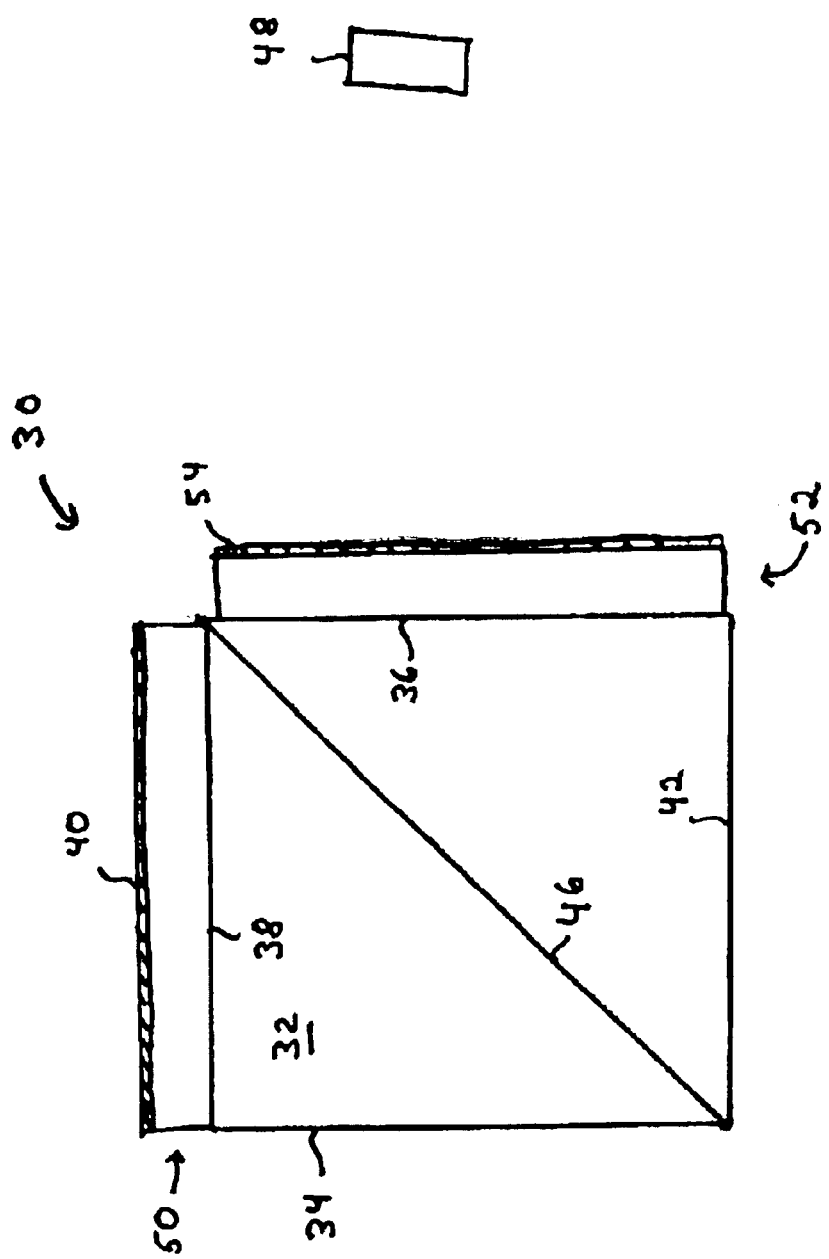
FIG. 2 shows the retarder of FIG. 1 integrally mounted on an interferometer.

The reference and measurement beams shown in FIGS. 2–4 include, as their respective substrates 12, the cube 32 itself. The cover plates of the reference and measurement retarders 50, 52 are fused silica cover plates. The cover plate of the reference retarder 50 has an outer surface coated with a reflective material that forms the reference mirror 40. The cover plate 14 on the measurement retarder 52 has an outer surface coated with a high efficiency anti-reflective coating 54.

A retarder 10 as shown in FIG. 1 is manufactured by attaching the cover plate 14 to a jig that travels toward or away from the stationary substrate 12 along a rail. The jig holds the cover plate 14 with its inner surface 18 parallel to the inner surface 20 of the substrate 12. The jig is then moved toward the substrate 12 until the extent of the gap 16 between the substrate 12 and cover plate 14 reaches a selected value. The polymer film 28 is then inserted into the gap 16 and held there until an adhesive 26 is injected into the remaining space on either side of the polymer film 28. The adhesive 26 is then cured. This procedure results in a retarder 10 in which the inner faces 18, 20 of the substrate 12 and cover plate 14 are parallel.

Because of manufacturing defects, there may be flaws in the cube 32. For example, the beam-splitting plane 46 may be misaligned, or the faces of the cube 32 may not be perpendicular to each other. These manufacturing defects can cause the beam to exit the reference face 38 or the measurement face 36 at an angle other than a right angle. To correct for such errors, the cover plate 14 of the retarder 10 is canted at an angle, as shown in FIG. 5.

Figure 5:
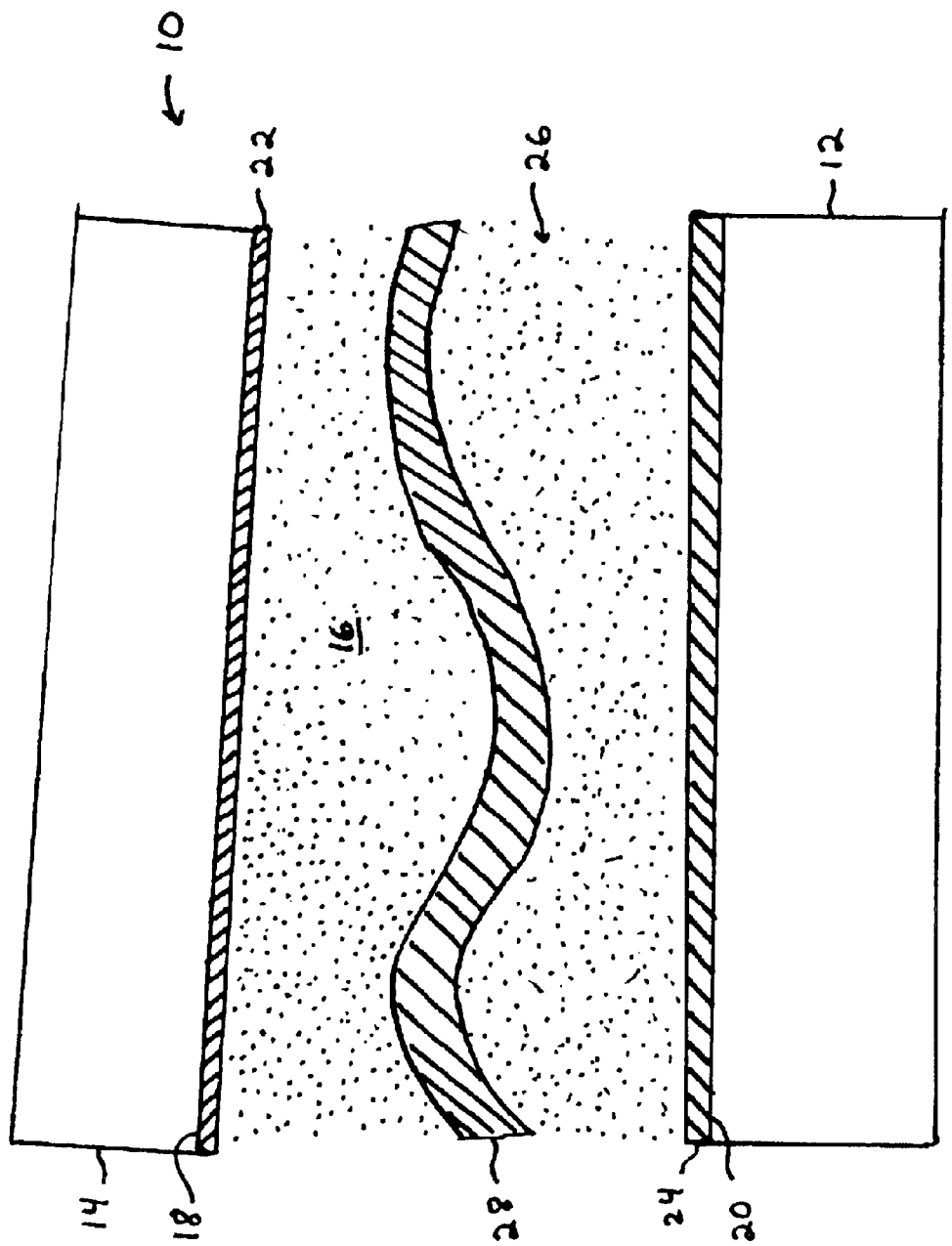
FIG. 5 is a cross-section of the retarder in FIG. 1 with its cover plate canted.

The orientation of the cover plate 14 in FIG. 5 will depend on the nature and extent of the manufacturing defect to be corrected. As a result, the placement of the cover plate 14 requires feedback from a metrology system such as an optical auto-collimator or an interferometer.

In one manufacturing method, the cover plate 14 is held on a jig that can both tilt and translate the cover plate 14 relative to the substrate 12. The jig translates inward until the extent of the gap 16 between the inner surfaces 18, 20 reaches a selected value. A beam is then passed through the substrate 12 and cover plate 14. The beam exits the cover plate 14 and illuminates a spot on a distant target. The difference between the location of this illuminated spot and that of a desired spot provides a measure of the extent of correction required. The jig is then tilted so as to reduce this difference.

Once the illuminated spot and the desired spot are within a selected tolerance of each other, the polymer film 28 is inserted and held between the cover plate 14 and the substrate 12. An adhesive 26 is then injected into the remaining space on either side of the polymer film 28.

The materials making up the various constituents of the retarder 10 need not be those specified herein. For example, anti-reflective coatings other than thorium fluoride are available, and materials other than fused silica can be used as substrates 12 and cover plates 14. The polymer film 28 can be made of polyvinyl alcohol or polycarbonate. The adhesive 26 is an optically clear adhesive 26 that is either UV cured or temporally cured.

In the foregoing description, the retarder 10 is shown used in conjunction with an HSPM interferometer 30. In that embodiment, the cube 32 forms the substrate 12 of the retarder 10. However, the retarder 10 can be used in devices other than the HSPM interferometer 30. Moreover, the retarder 10 need not be integrated into the device as described above.

I claim:

1. An interferometer comprising:
   a polarizing beam splitter optic;
   a cover plate separated from a face of said polarizing beam splitter optic by a gap;
   an adhesive filler occupying said gap; and
   a birefringent film embedded in said adhesive filler, said birefringent film being index matched to said adhesive filler.

2. The interferometer of claim 1, further comprising an anti-reflective coating on a surface of at least one of said cover plate and said face.

3. The interferometer of claim 2, wherein said coating comprises thorium fluoride.

4. The interferometer of claim 1, wherein at least one of said cover plate and said face comprises fused silica.

5. The interferometer of claim 1, wherein said birefringent film comprises a polymer film.

6. The interferometer of claim 1, wherein said face and said cover plate each have an inner surface facing said gap, said inner surfaces being oriented parallel to each other.

7. The interferometer of claim 1, wherein said face and said cover plate each have an inner surface facing said gap, said inner surfaces being oriented relative to each other to direct a beam exiting said cover plate in a selected direction.

8. The interferometer of claim 1, wherein said cover plate and said face are disposed relative to each other to direct a beam exiting said cover plate in a selected direction.

9. The interferometer of claim 1, wherein said adhesive filler has a dielectric constant that is an average of a slow-wave dielectric constant associated with said birefringent film and a fast-wave dielectric constant associated with said birefringent film.

10. The interferometer of claim 1, wherein said birefringent film is selected from the group consisting of polyvinyl alcohol and polycarbonate.

11. The interferometer of claim 1, wherein the birefringent film is oriented to function as a wave plate for light passing through the birefringent film between the cover plate and the polarizing beam splitter optic.

12. The interferometer of claim 11, wherein the birefringent film functions as a quarter wave plate for light passing through the birefringent film between the cover plate and the polarizing beam splitter optic.

13. The interferometer of claim 1, wherein the interferometer is configured as a distance measuring interferometer.

* * * * *